March 13, 1928.
T. CHANN
BRAKE MECHANISM FOR AUTOMOBILES
Filed April 29, 1927
1,662,183
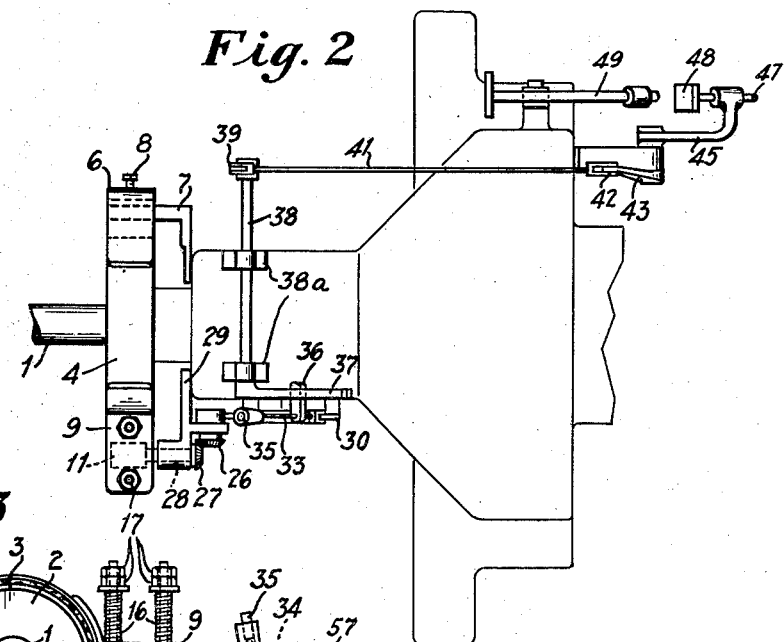
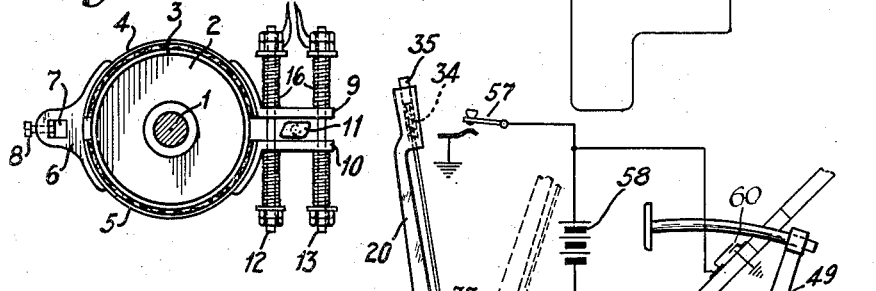
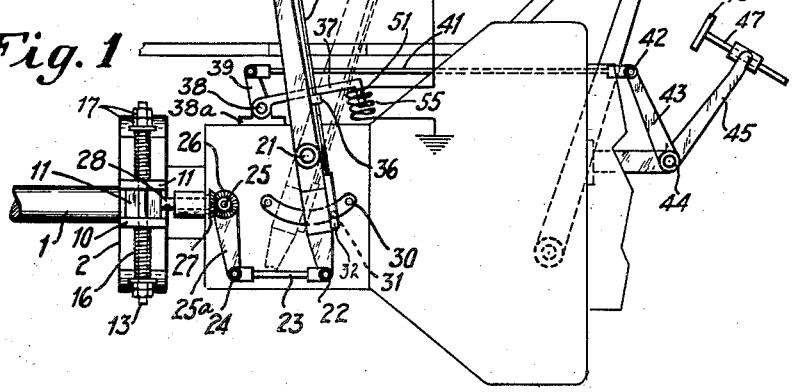
INVENTOR
THOMAS CHANN
BY
ATTORNEY Patented Mar. 13, 1928.

1,662,183

UNITED STATES PATENT OFFICE.

THOMAS CHANN, OF NEW YORK, N. Y.

BRAKE MECHANISM FOR AUTOMOBILES.

Application filed April 29, 1927. Serial No. 187,483.

This invention relates to braking mechanism for vehicles, and more particularly to brake mechanism especially adapted and arranged for use on automobiles to supplement the usual service brakes.

The usual type of automobile in common use today is provided with mechanical service brakes operable by a pedal mounted in such a position as to be engaged by the driver's foot and depressed toward the floor of the driver's compartment. As is understood in the art, the brake bands are lined with a friction fabric which is worn away in service, with the result that periodic adjustments are necessary to compensate for wear on the brake lining. Moreover, in certain types of hydraulic brakes, leakage of the fluid may take place around the pistons of the braking system and it is occasionally necessary to pump a fresh supply of liquid into the braking system from the supply tank. Such brakes as well as the mechanical brakes, are also subject to wearing of the brake lining in use.

As the wear and leakage referred to above is usually gradual, it is necessary for the service brake pedal in stopping the vehicle in the usual manner, to be depressed further and further; and usually this is not noticed by the driver until it becomes necessary to make a sudden stop to avoid accident or for some other purpose, at which time he may find that it is impossible to set the service brakes by depressing the brake pedal because of the fact that said pedal strikes against the floor boards before the brakes are fully set. By the time that the driver has discovered this fact and has thought to apply the emergency brake, it may be too late to avert an accident.

It is an object of this invention to provide a brake which will be automatically applied without any further thought or action on the part of the driver, and without lapse of time in case of failure of the service brakes to operate, and which by its application will serve to indicate to the driver that the service brakes are out of order and need adjustment.

It is a further object of this invention to provide means whereby the braking mechanism according to my invention may be applied by the operation of electrical means controlled by means of a switch such as a push button placed upon the steering wheel or some other suitable location convenient to the driver's hands.

It is a further object of this invention to provide improved brake mechanism in which the pressure applied to the brake and the stress and strain on the various parts is substantially uniform, resulting in a brake having long life and high reliability.

It is a further object of my invention to provide improved mechanical and electrical means adapted to interact one with another for the application of the brake mechanism. Still other objects of my invention will be apparent from the specification.

The features of novelty which I believe to be characteristic of my invention are set forth with particularity in the appended claims. My invention, however, both as to its underlying principles and as to its particular embodiments will best be understood by reference to the specification and accompanying drawing, in which:

Fig. 1 is a side elevation of one form of mechanism according to my invention.

Fig. 2 is a plan view thereof; and,

Fig. 3 is a detail view of brake drum and brake energizing mechanism.

In accordance with my invention, I provide a brake drum on some rotating part of the running gear, preferably upon the propeller shaft and adjacent the transmission housing. I also provide a brake band in operative relation with the said brake drum, and arranged to be biased to braking position, preferably by means of suitable springs. I also provide a detent mechanism for engaging and releasably maintaining the brake in released position against the action of the spring bias. For the purpose of permitting the instantaneous application of the brake, I provide a trip or trigger adapted to withdraw the detent mechanism to permit the setting of the brakes in response to the biasing action of the springs. This trip or trigger may take the form of several release mechanisms; for example, there may be an electrically operated trip controlled by means of a push button on the steering wheel. Preferably, also there will be provided a trip mechanism, either mechanical or electrical, or the equivalent thereof, adapted to be sprung when the service brake has been depressed to a certain extent, to insure the setting of the brake according to my invention in case the service brakes are not functioning properly.

Referring now more particularly to Fig. 1, 1 designates a propeller shaft provided with a brake drum 2 having a braking surface 3 formed thereon. Brake bands 4 and 5 are attached as by riveting to a support 6 carried by a projection 7, suitably mounted upon the transmission housing. An adjusting screw 8 is provided for the purpose of shifting the brake band support 6 to compensate for wear of the brake lining which will be secured to the inside of brake bands 4 and 5. A pair of actuating members 9 and 10 are suitably secured to the brake bands 4 and 5, as for example by riveting, and the inner sides of said members 9 and 10 ride upon a cam 11, and are maintained in contact therewith by suitable brake energizing springs 16 mounted upon bolts 12 and 13 extending through suitable openings in the members 9 and 10. Adjusting nuts 17 are provided, preferably two at each end of each bolt, by means of which the proper tension may be secured and maintained on the brake energizing springs 16. The dimensions of the cam 11 will be so chosen that in its position corresponding to brake applying position, the members 10 and 11 will be forced toward each other through action of the springs 16 to cause the brake bands 4 and 5 to be applied with the desired force to the brake surface 3; whereas, in brake releasing position, the cam 11 will be rotated to force the members 9 and 10 apart against the action of the springs, thereby releasing the brakes.

For the purpose of releasing the brakes, I may provide brake release rod 20 suitably mounted upon shaft 21 secured to the transmission housing: the lower end of the release rod 20 is pivoted at 22 to a link 23, which in turn is pivoted at 24 to an arm 25ª, rotatably mounted on suitable stub shaft 25. Secured to the arm 25ª, I may provide a bevel gear 26 adapted to engage with a second bevel gear 27 secured upon the shaft 28, upon which is mounted the cam 11. The shaft 28 and shaft 25 may be suitably carried upon the bracket 29 secured to the transmission housing. An arcuate member 30 is mounted in spaced relation to the transmission housing and provided with a notch 31 adapted to be engaged by a detent 32 mounted upon release rod 33, provided with a spring biasing means 34 and terminating in a hand engaginig portion 35. In the position shown, the detent 32 is maintained in the notch 31, thereby securing the release rod 20 in the full line position against the pressure of the springs 16 which tend to rotate the cam 11, and thereby through the action of the gears 27 and 26 and link 23, urge release rod 20 to the position shown in the dotted lines. If now the hand engaging portion 35 be depressed to remove detent 32 from notch 30, the springs 16 pressing upon the members 9 and 10 will cause the rotation of the cam 11 to the point at which the brakes are set. Simultaneously, the release rod 20 will move to the position shown in the dotted lines, and must be returned by hand to the full line position to release the brake.

For the purpose of permitting the automatic operation of the braking means in case the service brake pedal is depressed to a predetermined point there is provided a suitable trip adapted to be operated by the service brake pedal when depressed to such predetermined point. This mechanism may consist of a projection 36 mounted on the detent release rod 33 and adapted to be engaged by an arm 37 mounted upon shaft 38, rotatably mounted in suitable brackets 38ª on the transmission housing. A second arm 39 is provided, connected to link 41, pivoted at point 42 to an arm 43, secured to shaft 44 and carrying a second arm 45 extending at an angle with respect to arm 43. The arm 45 carries at its extremity, an upwardly extending and if desired, adjustable portion 47 provided with a bearing surface 48, disposed in such relation as to be engaged by the service brake operating lever 49 connected to the usual form of service brake mechanism. Since the precise form of this service brake mechanism forms per se no part of my invention, it is omitted for the sake of simplicity, it being understood that any well known form of brake mechanism is employed, operated by depression of the service brake pedal 49, when the service brake pedal has been moved through a predetermined distance.

Operation of the service brake in case it is properly adjusted will not cause application of the brakes on the braking surface 3, since the trip face 48 is so disposed that it will not be engaged by the service brake lever 49 in proper adjustment. If, however, the service brake bands are worn, or for any other reason the brakes are out of adjustment and do not apply, depression of the brake pedal past the normal point at which the brakes should apply, will cause the lever 49 to engage the face 48 on extension 47, thereby rotating arm 45 clockwise, moving link 41 to the right, rotating arms 39 and 37 clockwise, and depressing the detent operating rod 33, which permits the springs 16 to set the brakes, as already described.

For the purpose of permitting the brakes to be applied from the steering wheel, the arm 37 may be provided with a downwardly projecting extension 51 of magnetic material adapted to be attracted by electro-magnet 55, energized by a suitable source of electrical energy 58, which may be the car starting and lighting battery or generator, through the closure of suitable switch 57, which may be a push button mounted in any convenient place as upon the steering wheel, the dash, or the like. A similar switch 60 may be placed to be engaged by the service brake pedal either in place of, or in addition to the mechanical trip already described. It will be understood that the form of mechanism shown is by way of example, and that various other mechanisms may be used in place of that shown.

It will thus be seen that I have provided a mechanism by which the failure of the service brakes to operate in an emergency, automatically causes the operation of the emergency brake without any time lag through the action of the driver. The operation of the emergency brake through the means described, also serves to notify the driver that his service brakes are not operating properly and should be adjusted, and therefore serves as a warning of danger.

At the same time, the service brake pedal may be continued in use by the driver until suitable adjustments can be made: and under these conditions, it will be clear that it is safer to drive a vehicle provided with brakes according to my invention than with brakes according to the prior art, since the application of the service brake is instinctive with drivers, whereas the application of the emergency brake is unusual, and requires a definite mental process requiring the lapse of time to set it in operation: therefore, even though the service brakes may be defective, the instinctive depression of the service brake pedal by the driver in a moment of emergency serves to release the brakes according to my invention instantaneously with the pressure of the service brake pedal and does not require the driver to think of the fact that the service brake is out of adjustment and that the emergency brake must be used.

While I have shown and described certain preferred embodiments of my invention, it will be apparent that modifications and changes may be made without departing from the spirit and scope of my invention, as will be understood by those skilled in the art.

I claim:—

1. The combination with an automobile having a service brake pedal for operating the service brakes, of a second brake biased to brake applying position, means for maintaining said second brake out of brake applying position, and means associated with said service brake pedal for releasing said second brake to brake applying position.

2. The combination with an automobile having a service brake pedal for operating the service brakes, of a second brake biased to brake engaging position, means for maintaining said second brake out of brake applying position against said bias, and means associated with said service brake pedal for releasing said second brake to brake applying position, upon failure of said service brakes.

3. The combination with an automobile having a service brake pedal for operating the service brakes, of a second brake biased to brake applying position, means for maintaining said second brake out of brake applying position against said bias, and electromagnetic means for releasing said second brake to brake applying position.

4. The combination with an automobile having a service brake pedal for operating the service brakes, of a second brake biased to brake applying position, means for maintaining said second brake out of brake applying position against said bias, means associated with said service brake pedal for releasing said second brake to brake applying position upon failure of said service brakes, and means for releasing said second brake to brake applying position independently of the operation of said service brake.

5. The combination with an automobile having a service brake pedal for operating the service brakes, of a second brake biased to brake applying position, means for maintaining said second brake out of brake applying position against the action of said bias, and means associated with said service brake pedal for releasing said second brake to brake applying position upon predetermined movement of said service brake pedal through a distance greater than that normally required for operation of the service brakes.

Signed at New York city, in the county of New York and State of New York, this 28th day of April, A. D. 1927.

THOMAS CHANN.